May 26, 1942.     H. S. OGDEN     2,284,442
LOCOMOTIVE CONTROL SYSTEM
Filed Nov. 5, 1940
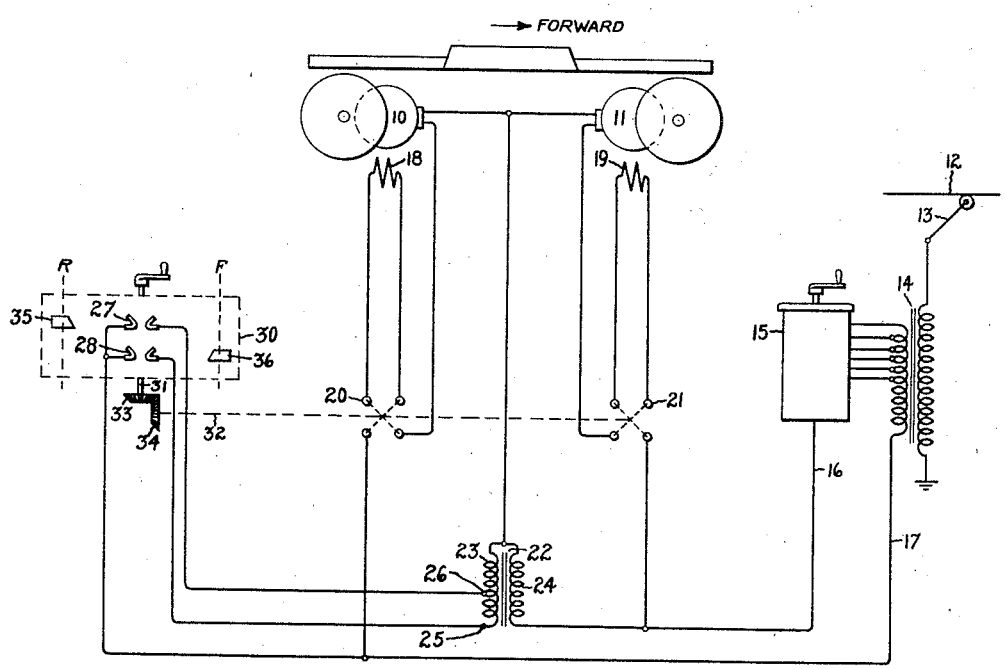
Inventor:
Harold S. Ogden,
by Harry E. Dunham
His Attorney.

Patented May 26, 1942

2,284,442

UNITED STATES PATENT OFFICE 2,284,442

LOCOMOTIVE CONTROL SYSTEM

Harold S. Ogden, Erie, Pa., assignor to General Electric Company, a corporation of New York Application November 5, 1940, Serial No. 364,369

9 Claims. (Cl. 105—61)

My invention relates to control systems for locomotives, and is particularly applicable to driving trucks having a plurality of spaced driving wheels each associated with a driving motor.

In the operation of driving trucks of the type described, it has been found that the various wheels of the trucks do not carry equal weights. The difference in the weight imposed upon the various wheels of a truck has been found to depend upon numerous factors, each of which is a function of the direction of motion of the vehicle. For example, the draw bar pull, and the unbalanced motor torques acting between the separate axles of the truck and the frame introduce differences in the weight imposed upon the various spaced wheels of any single truck.

The tractive effort of a locomotive is the force exerted at the rim of the driving wheels. The "adhesion," or tractive coefficient, is usually defined as the quotient of the tractive effort in pounds which will slip the drivers divided by the weight on the drivers. This quantity is usually expressed as a percentage and may be defined as $$\frac{Fm}{W}$$

where $Fm$ is the tractive effort required to slip the drivers and $W$ is the weight carried by the drivers. By usage, however, it has become customary to refer to "percentage adhesion" somewhat more broadly as the quotient of the tractive effort exerted by the drivers at any selected operating point divided by the weight applied to the drivers. This may be expressed as $$\frac{F}{W}$$

where $F$ is the tractive effort exerted by the driving wheels and $W$ is the weight on the drivers. Since the tractive effort $F$ is a function of the torque of the driving motors, it is desirable to vary the torque of each motor in proportion to the weight imposed upon the wheel driven thereby. If the percentage adhesion for each wheel is the same, all wheels should begin to slip simultaneously. While such a condition is exceedingly difficult of attainment in practice, nevertheless, if it is approximated, the maximum tractive effort will always be available at the wheels.

Accordingly, it is an object of my invention to provide simple and reliable means for maintaining substantially the same percentage adhesion at each driving wheel of a vehicle despite the shifting of the weight between the driving axles, particularly where series connected alternating current motors are used for driving the vehicle.

In carrying out my invention, I provide means for varying the torques of series connected driving motors in accordance with the weights imposed upon their associated driving axles. In one form of my invention, I provide a transformer which is connected across the motor circuit, the two windings of the transformer being connected in series with each other and the midpoint between the two windings being connected to the electrical mid-point between the motors which drive different axles of the vehicle. Tap changing means operated by the motor reverser are arranged to vary the connections of at least one of the motors to at least one of the transformer windings.

The features of my invention which I believe to be novel and patentable will be pointed out with particularity in the appended claims, but for a more complete understanding of my invention, reference should be had to the accompanying drawing, the single figure of which is a schematic diagram of a vehicle truck combined with a circuit diagram of connections for the truck driving motors embodying my invention.

Referring now to the drawing, I have shown my invention in one form as applied to series connected driving motors 10 and 11 of the single-phase commutator type. It is obvious, of course, that a plurality of motors may be substituted for either or both of the above motors, if desired, without departing from the spirit and scope of my invention. The motors 10 and 11 are energized from a trolley wire 12, supplied with single-phase alternating current, energy being taken off through a trolley 13 and a transformer 14. By means of a suitable manually-operated controller 15, which may be a drum controller, a supply conductor 16 leading to one side of the motor circuit may be connected to a selected tap of suitable voltage on the secondary winding of the transformer 14 so as to control the speed of the motors, the other side of the motor circuit being connected through a supply conductor 17 to the other side of the transformer secondary. Field windings 18 and 19 are provided for the motors 10 and 11 respectively and are connected in series with the motors through reversing switches 20 and 21 respectively.

In shunt with the motors 10 and 11 and their respective series fields 18 and 19, I provide a transformer 22 which comprises a plurality of series connected windings 23 and 24 wound upon a single core in mutually inductive relationship.

The windings 23 and 24 are so connected that the magnetic flux generated by the winding 23 is in the same direction as that generated by the winding 24. Under these conditions it will be apparent that, if the windings were of an equal number of turns and the motors both rotating at the same speed the transformer inductance will be at its maximum and only a small magnetizing current would flow through the transformers. Such an arrangement with a 1 to 1 ratio between the transformer windings to prevent wheel slippage is described and claimed in my Patent 2,209,826, issued July 30, 1940.

In my present improved arrangement I provide the winding 23 of the transformer 22 with a plurality of taps 25 and 26 selectively connectable through the contact fingers 27 and 28 respectively to the power lead 17. For the purpose of controlling the direction of operation of the motors 10 and 11, I have provided a manually-operable reverser 30 connected through the shafts 31 and 32 and the gears 33 and 34 to the reversing switches 20 and 21 controlling the series fields 18 and 19 respectively of the motors 10 and 11 respectively. The manually-operable reverser 30 is shown having two cams 35 and 36 in cooperative relation with the contact fingers 27 and 28 respectively and adapted selectively to close these contact fingers. The transformer 22 is arranged so that the voltage supplied by the winding 24 has a value intermediate that supplied by the winding 23 from its tap 26 and that supplied by the winding 23 from its tap 25.

As has been previously pointed out, it has been found that the axles of swivel trucks are usually unequally loaded, and that the direction of unbalance of the loading is a function of the direction of operation of the vehicle. It has also been found that in such trucks the trailing axle is more heavily loaded than the leading axle. Accordingly, the transformer 22 is arranged to supply unequal voltages to the motors 10 and 11, the relatively higher voltage being supplied to that motor driving the wheel upon which is imposed the heaviest weight. Referring now to the drawing, if the reverser 30 is thrown to its forward position "F" for operation of the vehicle in the "forward" direction indicated on the drawing, the motor 11 will be leading and the cam 36 will have closed the contact finger 28 to connect the motor 10 to the tap 25 of the transformer 22. Thus the voltage supplied to the trailing motor 10 is higher than that supplied to the leading motor 11, with the result that the torque of the more heavily loaded trailing motor 10 is increased relative to the torque of the leading motor 11. Similarly, if the direction of operation of the vehicle is reversed by throwing the manually-operable reverser 30 into its reverse position "R," the cam 35 will close the contact finger 27 to connect the tap 26 of the transformer 22 to the power lead 17. In this case the ratio of the amounts of energy supplied to the motors is so adjusted that a relatively greater amount of energy is supplied to the trailing motor 11 than to the leading motor 10.

The operation of the transformer 22 will be readily understood if it is assumed that in each connection the transformer sets up circulating currents from the transformer through the traction motors 10 and 11 in a direction to add to the current in the traction motor with the highest voltage and to detract from the current in the motor with the lowest voltage. For example, if the motor 10 is connected to the tap 25 of the transformer 22 for forward operation as shown, and voltage is applied to the line, the voltage drop across the winding 23 will be greater than that across the winding 24 of the transformer 22 in proportion to the turn ratio of the windings. Since these windings 23 and 24 are in parallel respectively with the motors 10 and 11, a greater voltage is impressed across the motor 10 than across the motor 11. This condition cannot persist unless the current through the motor 10 is greater than that through the motor 11. To supply this current circulating currents may be considered to be set up through the transformer windings and the motors. From the higher voltage winding 23 of the transformer 22 a current, which may be designated at $I_t$, is sent through the motor 10 in a direction to add to the line current, which may be designated as I. The current $I_t$ through the winding 23 of the transformer induces in the winding 24 a current $I'_t$ in the opposite direction, that is, in a direction to subtract from the current I passing through the motor 11. The current $I'_t$ will differ from the current $I_t$ in proportion to the turn ratio of the windings 23 and 24, and, under the conditions assumed, it will be smaller than $I_t$. It will now be apparent that the total current passing through the motor 11 will be $I-I'_t$ and the total current passing through the motor 10 will be $I+I_t$. The larger voltage drop across the motor 10 is thereby maintained, and the relatively greater amount of energy supplied to the motor 10 enables that motor to develop a greater torque than the motor 11. In this manner the tractive effort on each of the two axles is adjusted to a value which will give the same percentage adhesion on both of them.

Another way of explaining the action of the transformer 22 is to consider it as a reactor connected in shunt with the two motors 10 and 11, the midpoint of the motors being connected to a variable intermediate point of the reactor. It will then be apparent that the voltage of the intermediate point of the reactor fixes the voltage of the point at which the motors are connected together, so that different voltages are applied across the two motors.

It will be readily understood, of course, that the particular voltage ratio selected between the taps 25 and 26 of the transformer 22 will depend upon the magnitude of the normal weight differential under the particular operating conditions to which my invention is applied. At this point it may be well to note that I do not wish to be limited to the exact number of motors and axles driven thereby which are described herein, since the number of motors and axles may be increased without departing from the spirit and scope of my invention. It is believed that it will be obvious to one skilled in the art that my invention may be adapted for use with any number of traction motors forming any number of groups of motors connected in series relationship for driving a like number of axles, i. e., one axle driven by one group of motors, etc. For instance, if three motors or three groups of motors are to be serially connected for driving three axles the transformer 22 would become a three winding transformer, the details of connection being slightly different from those with two axles and two groups of motors as shown in the drawing.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. The combination of a plurality of electric motors connected in series circuit relation to drive spaced wheels of a vehicle, means for energizing said motors, reversing means for said motors, and means for maintaining substantially the same percentage adhesion at said wheels comprising a plurality of inductively coupled windings connected respectively in parallel circuit relation with said motors, and switching means for varying the inductive coupling of said windings to vary the relative amounts of energy supplied to said motors.

2. The combination of a plurality of electric motors connected in series and arranged to drive separate longitudinally spaced wheels of a vehicle, means for energizing said motors, reversing means for said motors, a plurality of inductively coupled windings connected respectively in parallel circuit relation with said motors thereby to maintain an inequality between the amounts of energy supplied to said motors, and means disposed to be actuated in conjunction with said reversing means for varying the connection of at least one of said windings to control said inequality in accordance with the direction of motion of said vehicle.

3. The combination of a plurality of electric motors connected in series and arranged to drive separate longitudinally spaced wheels of a vehicle, means for energizing said motors, reversing means for said motors, a plurality of inductively coupled windings connected in series, each of said windings being connected in parallel circuit relation with one of said motors, and means operated by said reversing means for varying the connection of at least one of said windings to the motor connected in parallel therewith.

4. The combination of a plurality of electric motors connected in series and arranged to drive separate longitudinally spaced wheels of a vehicle, means for energizing said motors, a reversing means for said motors, a plurality of inductively coupled windings connected in series, each of said windings being connected in parallel circuit relation with one of said motors, and tap changing means operated by said reversing means for varying the connection of at least one of said windings to the motor connected in parallel therewith.

5. In a control system for an electrically driven vehicle, a plurality of electric motors connected in series circuit relation and arranged to drive spaced wheels of the vehicle, means for energizing said motors, reversing means for said motors, transformer means having a plurality of windings connected respectively in parallel circuit relation with said motors, and means operated by said reversing means for controlling the connection of said winding to said motors to vary the relative amounts of energy supplied to said motors.

6. In a control system for an electrically driven vehicle, a plurality of unequally loaded electric motors connected in series and arranged to drive separate longitudinal spaced axles of the vehicle, means for energizing said motors, reversing means for said motors, a plurality of inductively coupled windings having different numbers of turns and connected in series relationship, and means operated by said reversing means for connecting said winding having the greater number of turns across said more heavily loaded motor and connecting said winding having the smaller number of turns across said more lightly loaded motor.

7. In a control system for an electrically driven vehicle, a plurality of unequally loaded electric motors connected in series and arranged to drive separate longitudinally spaced axles of the vehicle, means for energizing said motors, reversing means for said motors, a plurality of inductively coupled windings having different numbers of turns and connected in series relationship, each of said windings being connected across one of said motors, and tap changing means associated with one of said windings and disposed to be operated by said reversing means, whereby said more heavily loaded motor always has said winding of a greater number of turns connected in shunt therewith.

8. The combination of at least two series connected electric motors arranged to drive spaced wheels of an electric vehicle, means for energizing said motors in series with each other, a transformer having a winding connected in shunt with each of said motors, reversing means for said motors, and means actuated by said reversing means for varying the inductive relation of said windings thereby to control the voltage maintained at the midpoint of said series connected motors.

9. The combination of a plurality of series connected electric motors arranged to drive spaced wheels of an electric vehicle, means for energizing said motors in series with each other, a transformer having a plurality of windings each connected in shunt with one of said motors, reversing means for said motors, and means controlled by said reversing means for varying the turn ratio of said windings, whereby substantially the same percentage adhesion is maintained at all said wheels.

HAROLD S. OGDEN.